June 14, 1927.

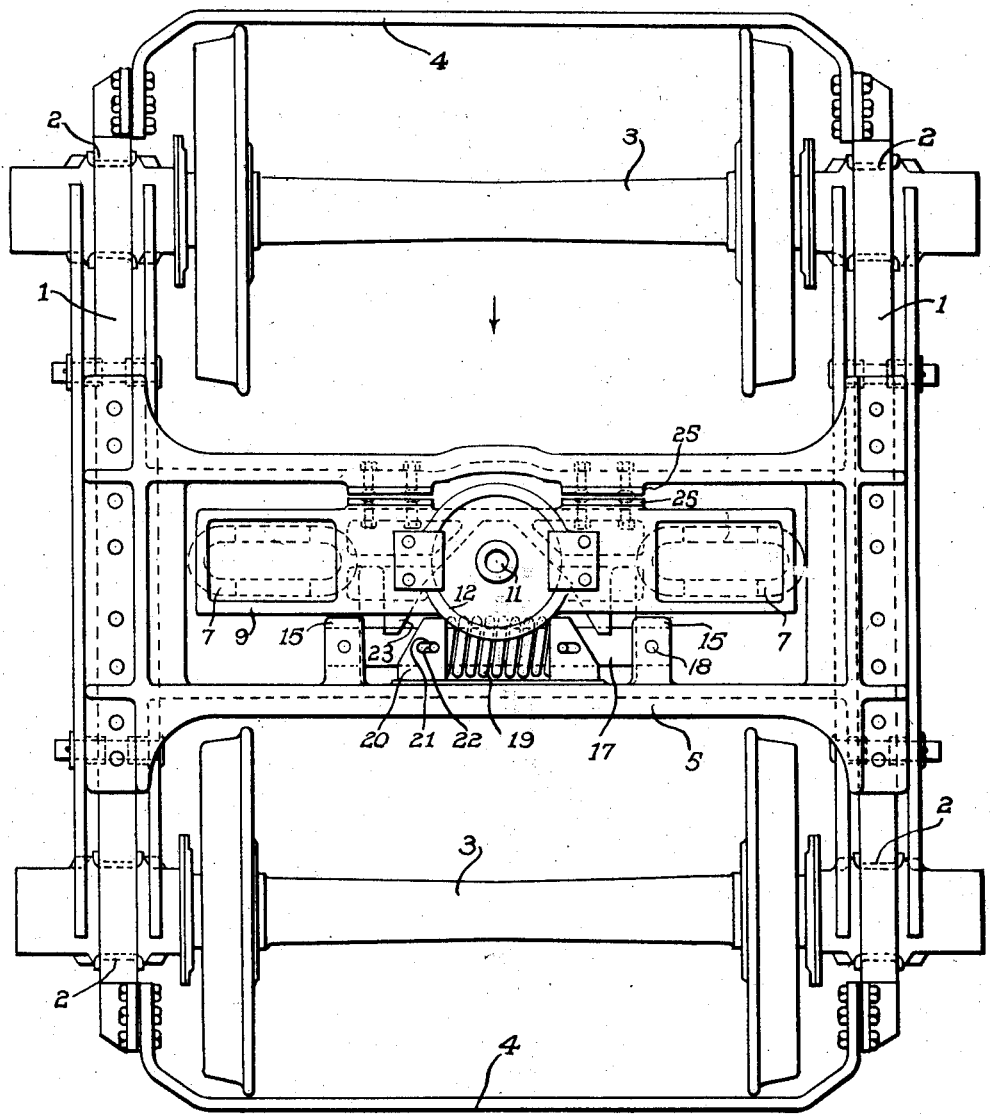

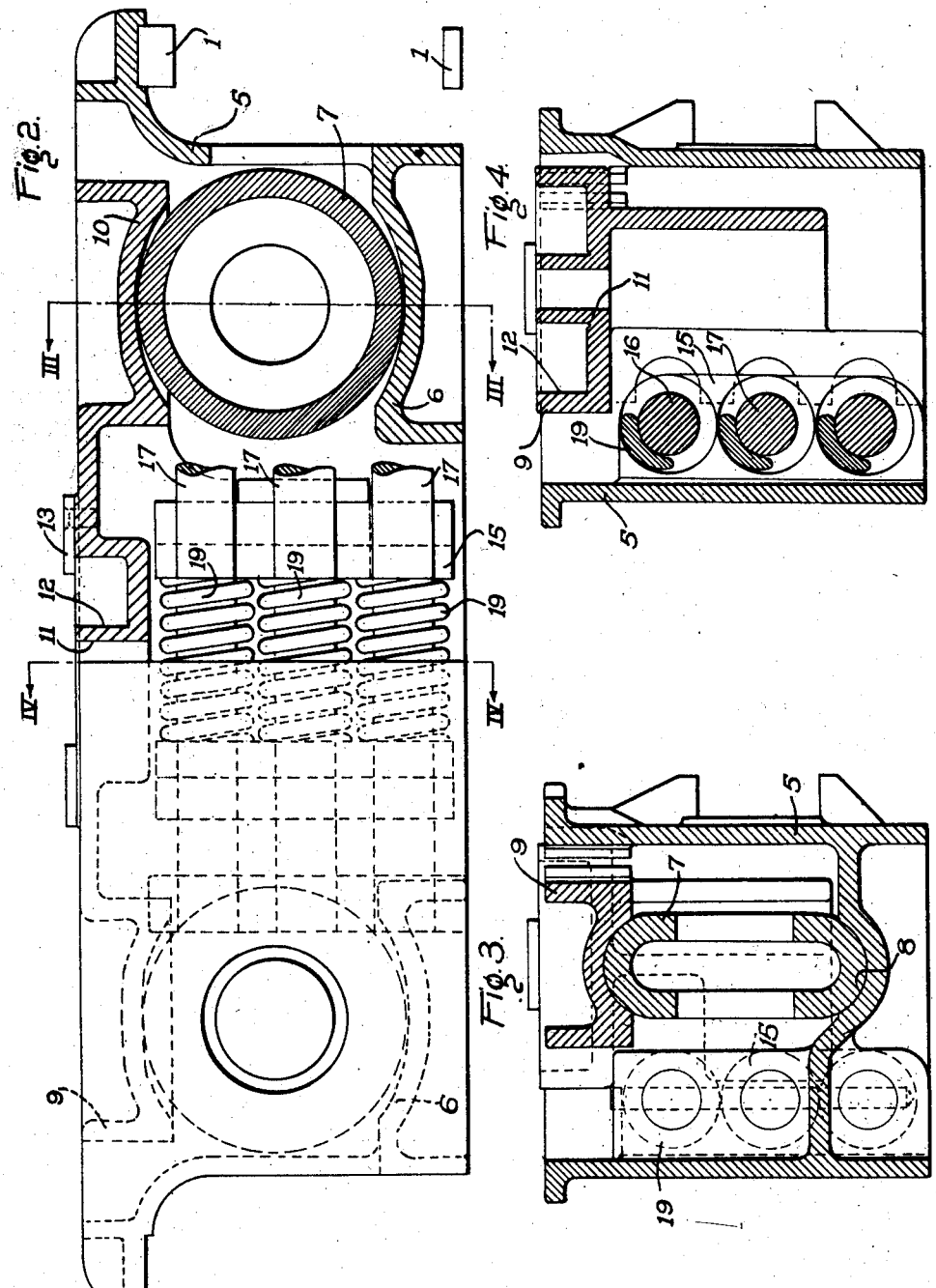

C. JABLOW 1,632,077

GUIDING TRUCK

Filed Oct. 15, 1923

WITNESSES:

INVENTOR
Charles Jablow.
BY
ATTORNEY

Patented June 14, 1927.

1,632,077

UNITED STATES PATENT OFFICE.

CHARLES JABLOW, OF EAST PITTSBURGH, PENNSYLVANIA, ASSIGNOR TO WESTINGHOUSE ELECTRIC & MANUFACTURING COMPANY, A CORPORATION OF PENNSYLVANIA.

GUIDING TRUCK.

Application filed October 15, 1923. Serial No. 668,489.

My invention relates to railway vehicles, more especially to guiding and trailing trucks that are associated with the main frame of railway locomotives, particularly electrical railway vehicles, at the head and the trailing ends.

It is among the objects of my invention to provide a guiding truck, or the like, for electric locomotives which shall be of simple mechanical construction, which shall function efficiently to produce a steering action relative to the truck and vehicle body and which shall be applicable to standard railway locomotives, particularly locomotives of the articulated type.

In heavy traction locomotives, it is advantageous to provide guide trucks at the head end to assist in the steering action of the vehicle by closely following the gage, for the purpose of obtaining greater efficiency in operation and minimizing the flange wear of the drive wheels and stresses in the main frame of the locomotive. Various types of steering mechanisms have been proposed to accomplish this result all of which have some operating or structural limitations that make them mechanically complicated or inefficient in operation.

My present invention obviates the difficulties encountered in prior structures and further provides an automatic steering or guiding feature that produces a desired leading tendency when the truck is at the head end of a locomotive and when trailing, the truck is permitted to run free or idle in the gage with only a small amount of lateral restraint.

The construction of the truck transom and center pin bolster for associating the truck with the main frame of the vehicle is such as to provide a device that is designed to offer yielding lateral restraint, while permitting longitudinal movement by means of compression links that are applicable to either two or four-wheeled trucks.

In the accompanying drawings constituting a part hereof and in which like reference characters designate like parts:

Fig. 1 is a plan view of a four-wheeled truck embodying the principles of my invention, Fig. 2 is an end elevational view, partially in cross-section, of the transom and bolster embodied in the truck shown in Fig. 1, Fig. 3 is a cross-sectional view taken along the line III—III of Fig. 2, Fig. 4 is a cross-sectional view taken along the line IV—IV of Fig. 2.

Figure 5:
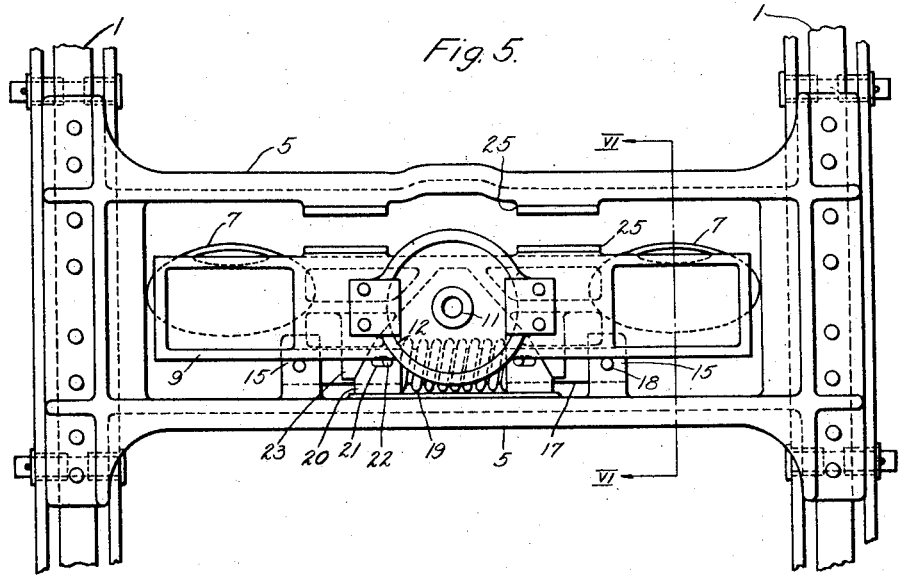
Fig. 5 is a plan view of a fragmentary portion of the truck and bolster showing the latter in its steering position.

The guide truck therein illustrated embodies the usual side-frame construction, journal-box mounting and wheeled axles 1, 2 and 3, respectively. The side frames 1 are secured rigidly at their ends by means of a plurality of transverse tie-rods 4. A centrally located transom 5 is secured to the longitudinal side frames 1 in a suitable manner, as by rivets or bolts, or it may be cast integrally therewith.

The transom 5 is provided with recessed or dished portions 6 that are adapted to respectively receive a plurality of members 7, of substantially torus shape, each having a convex outer surface 8, Fig. 3. The members 7 constitute compression links for a center pin bolster 9 that engages the members 7 at its seating portions 10, which respectively correspond to, and are located opposite the recesses 6 in the transom 5. The bolster 9 is provided with a central opening 11 and a recess 12 that are adapted to receive a center pin (not shown), which is secured therein by a ring 13, the other portion of the center pin being secured in the main frame of the vehicle body, in accordance with a familiar practice.

The transom 5 is further provided with extending brackets 15 having a plurality of openings 16 in horizontal axial alinement and adapted to receive cylindrical bodies 17 such as pins, tubes, or the like, which are secured in the brackets 15 by small pins 18. A plurality of helical springs 19 are disposed around the cylindrical members 17, each spring being positioned intermediate a pair of movable blocks 20 having slotted openings 21 that are adapted to engage pins 22 on the members 17. The blocks 20 are limited in their sliding movements by the stop pins 22, which are shown against the ends of the slots 21 and in this, their neutral position, the springs 19 are under initial compression. If desired, the block members 20 may be fixed on the transom 5 and the cylindrical members 17 may be adapted to move in the brackets 15 to accomplish the same relative function of movement against the coil springs 19. The bolster 9 is provided with a substantially V-shape or forked guide 23, which is adapted to engage the movable blocks 20 that are mounted on the transom 5.

A plurality of friction pads 25 are secured on the transom 5 and the bolster 9, respectively, to provide limited frictional engagement of these members when the truck member is in a trailing position.

The operation of this device is briefly as follows: Assuming the bolster 9 to have a center pin connection with the main frame of the vehicle and the truck to be on the head end of the locomotive and moving in the direction indicated by the arrow, the co-action of the bolster and the yielding restraining mechanism comprising the cylindrical members, springs and blocks 17, 19 and 20, respectively, is such as to produce a leading tendency of the truck member, that is to say, effect steering action of the vehicle body relative to the rails.

Figure 6:
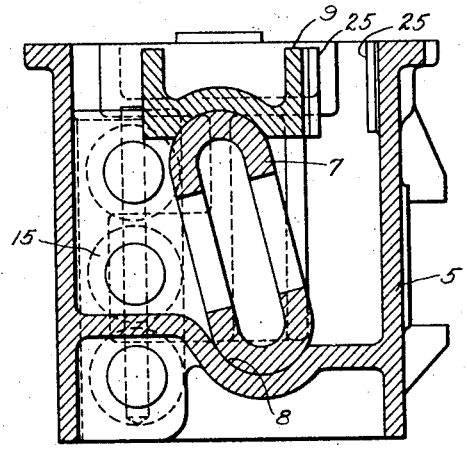
Fig. 6 is a view in cross section of the truck transom, bolster and one of the compression links.

This function is produced by the engagement of the forked guide 23 with the movable blocks 20, (as shown in Fig. 5) which engagement is automatically effected by the adhesion of the wheels to the rails or in other words, by the weight on the wheel axles. This condition automatically causes the bolster to fall into engagement with the blocks 20, which are adapted to produce a positive steering action. In this position, the compression links or rollers 7 are inclined slightly from the vertical center line towards the rear end of the truck (as shown in Fig. 6).

Should the locomotive be reversed, the steering mechanism will be disengaged either automatically by the rolling resistance of the truck, or by slight application of the brakes on this truck, or by other means, and the bolster 9 will swing past the vertical center lines of the compression members 7 which become inclined in the opposite direction to effect engagement of the friction pads 25. The degree of longitudinal movement of the bolster and transom is fixed by the members 7 so that when the bolster engages the transom pads 25, the longitudinal force exerted by the weight on the bolster is equal to the starting resistance at the rail and this force maintains the bolster in a trailing position which permits the truck to run free in the gage with only such lateral restraint as may be imposed by the compression links 7.

In a leading position, the slopes of the links or rollers 7 are such that the angle of the block 20 does not tend to swing them to a vertical position.

The operation of the above-described mechanism is feasible for either two or four-wheeled trucks and the mechanism is efficient in its function of producing automatic steering and trailing action depending on the position of the truck member relative to the direction of travel of the locomotive.

Although I have described a specific embodiment of my invention, it will be obvious to those skilled in the art that various modifications may be made in the construction of the transom, bolster, tori or compression links and steering mechanism without departing from the principles herein set forth.

I claim as my invention:—

1. A guide truck for railway vehicles comprising a wheeled truck frame, a transom connecting the side frames thereof, a bolster mounted on said transom, and steering means associated with said transom and bolster comprising a plurality of roller links capable of longitudinal and limited lateral movement on said transom.

2. A guide truck for railway vehicles comprising a wheeled truck frame, a transom connecting the side frames thereof, a bolster mounted on said transom, and steering means associated with said transom and bolster comprising a plurality of substantially torus shape roller links capable of longitudinal and limited lateral movement on said transom.

3. A guide truck for railway vehicles comprising a wheeled truck frame, a transom connecting the side frames thereof, a bolster mounted on said transom, steering means associated with said transom and bolster comprising a plurality of roller links having a convex periphery capable of longitudinal and limited lateral movement on said transom.

4. A guide truck for railway vehicles comprising a wheeled truck frame, a transome connecting the side frames thereof, a bolster mounted on said transom, said transom and bolster having recessed portions, steering means associated with said transom and bolster comprising a plurality of roller links having a convex periphery seated in said recessed portions provided in said bolster and transom, said links being free to roll in a direction normal to their axis and be inclined transversely thereof.

5. The combination with a guide truck for railway vehicles, of a truck transom and movable centerpin bolster, said transom having a yielding lateral restraining mechanism adapted to co-operatively engage said bolster to effect relative steering action of said transom and bolster and to become disengaged therefrom to effect a trailing action therebetween.

6. The combination with a guide truck for railway vehicles, of a truck transom and movable centerpin bolster, said transom having a yielding lateral restraining mechanism adapted to be engaged by said bolster for effecting relative steering action of said truck and bolster, and to become disengaged therefrom to effect a trailing action therebetween.

7. The combination with a guide truck for railway vehicles, of a truck transom and movable centerpin bolster, said transom having a yielding lateral restraining compression mechanism adapted to be engaged by said bolster for effecting relative steering action of said truck and bolster.

8. The combination with a guide truck for railway vehicles, of a truck transom and movable centerpin bolster, said bolster being provided with a forked guide, said transom having a yielding lateral restraining mechanism adapted to be engaged by said bolster, said mechanism comprising a plurality of movable blocks and a plurality of spring-mounted cylindrical bodies carried thereby and adapted to engage said forked guide of said bolster.

9. The combination with a guide truck for railway vehicles, of a truck transom and movable centerpin bolster, said bolster being provided with a forked guide, said transom having a yielding lateral restraining mechanism adapted to be engaged by said bolster, and mechanism comprising a plurality of movable blocks, a plurality of resiliently mounted cylindrical bodies carried thereby and adapted to engage said forked guide of said bolster.

10. The combination with a guide truck for railway vehicles, of a truck transom and movable centerpin bolster, having a plurality of co-operating seating portions, a plurality of roller members movably mounted in said seating portions, a plurality of friction pads secured in co-operative alinement on said transom and bolster to effect frictional engagement thereof for one direction of truck travel, a plurality of resiliently mounted laterally movable blocks mounted on said transom and a guide portion on the opposite face of said bolster adapted to engage said blocks to effect steering of said bolster relative to the truck when the latter travels in the opposite direction.

11. The combination with a guide truck for railway vehicles, of a truck transom and movable centerpin bolster having a plurality of co-operating seating portions, a plurality of roller members movably mounted in said seating portions and adapted to roll transversely and be inclined longitudinally of the truck center line, a plurality of friction pads secured in co-operative alinement on said transom and bolsters to effect frictional engagement thereof for one direction of truck travel, a plurality of resiliently mounted laterally movable blocks mounted on said transom, and a guide portion on the opposite face of said bolster adapted to engage said blocks to effect steering of said bolster relative to the truck when the latter travels in the opposite direction.

12. A guide truck for railway vehicles comprising a wheeled truck frame, steering means associated therewith and a bolster mounted on said truck frame, said bolster being adapted to engage said steering means when the vehicle is traveling in one direction and to become automatically disengaged therefrom when the direction of travel is reversed.

13. A guide truck for railway vehicles comprising a wheeled truck frame, a transom connecting the side frames thereof and having a plurality of dished recesses therein, a plurality of substantially torus shaped roller links mounted in said recesses, and a bolster having corresponding dished recesses mounted upon said links.

In testimony whereof, I have hereunto subscribed my name this 9th day of October, 1923.

CHARLES JABLOW.